United States Patent [19]

Shirley, Jr. et al.

[11] Patent Number: 5,020,144
[45] Date of Patent: May 28, 1991

[54] RADIO COMPONENT REPLACEMENT/PROGRAMMING DEVICE

[75] Inventors: Thomas F. Shirley, Jr., Fort Worth; Jack B. Butler, Bedford, both of Tex.

[73] Assignee: Motorola, Inc., Schaumburg, Ill.

[21] Appl. No.: 175,361

[22] Filed: Mar. 30, 1988

[51] Int. Cl.$^5$ .............................................. H04B 1/16
[52] U.S. Cl. .................................. 455/186; 455/185; 455/151
[58] Field of Search ................ 455/76, 77, 183, 185, 455/186, 151; 364/221.9, 222.81, 227.3, 468, 919.2

[56] References Cited

U.S. PATENT DOCUMENTS

| | | | |
|---|---|---|---|
| 4,525,865 | 6/1985 | Mears | 455/186 |
| 4,688,261 | 8/1987 | Killoway et al. | 455/186 |
| 4,739,486 | 4/1988 | Soderberg et al. | 364/464 |
| 4,771,399 | 9/1988 | Snowden et al. | 455/186 |
| 4,792,986 | 12/1988 | Garner et al. | 455/186 |

OTHER PUBLICATIONS

The MC Micro Field Programmer Handbook, dated 1985 by Motorola GmbH Taunusstein.
Systems 9000 Trunked Radio Programmer, dated 1986 by Motorola, Inc.
Systems 9000 Conventional Options Programmer, dated 1985, Motorola, Inc.
Systems 9000 Conventional 64 Mode Radio and Control Head Programmer, dated Nov. 12, 1985.
Systems 9000 Conventional 32 Mode Radio and Control Head Programmer, dated Nov. 12, 1985.
EEPROM Programmer (Instruction Manual No. 68PO6088T60-0, published in 1984.
Users manual for programming the Mostar NVR (Manual No. 68P80100W88-0, published in 1985.
HT600 Programmer/Tuner User's Manual (Manual No. 68P81045C55-2.
SMARTNET Standalone Field Programmer Model T5124A (Programming Information Guide 68P-811-17E11-0, published in 1985.
Systems 9000 Conventional Radio Programmer Operator's Manual (Manual No. 68-80309B24-0, published in 1986.
Systems 9000 Conventional Control Head Programmer Operator's Manual, (Manual No. 68-80309B25-0, dated May 15, 1986).
Systems 9000 Trunked Control Head Programmer Operator's Manual (Operator's Manual No. 68-80309B-26-0, dated May 15, 1986.
"The μp: The Key to an Advanced Frequency Synthesized HF SSB Amateur Radio Transceiver"; IEE Transactions on Consumer Electronics; vol. CE-26; Aug. 1980; pp. 234-246, class 455/76.

Primary Examiner—Douglas W. Olms
Assistant Examiner—Ralph Smith
Attorney, Agent, or Firm—Steven G. Parmelee

[57] ABSTRACT

A programming station for use in programming and servicing two-way radios that include replaceable hardware elements. Both user-only and programming station-assisted steps are simultaneously displayed in a predetermined order. The steps may only be accomplished in a fixed allowed order.

16 Claims, 7 Drawing Sheets

MICROFICHE APPENDIX

This specification includes a microfiche appendix comprising 7 microfiche and 643 frames.

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to the programming and servicing of two-way radios.

BACKGROUND ART

Two-way radios are becoming increasingly sophisticated. Many such radios now realize many operating functions and features through provision of an on-board microprocessor. For example, some models of the Spectra land mobile radio, manufactured by Motorola, Inc., do not include any internal adjustable components such as potentiometers or coils. Instead, all RF and signalling parameters are controlled by an on-board microprocessor.

These increasingly sophisticated radios have given rise to a concurrent need for a similarly sophisticated means of servicing the radio, particularly in conjunction with the replacement of hardware elements in the radio.

SUMMARY OF THE INVENTION

These and other needs are substantially met through provision of the radio component replacement/programming device disclosed herein.

This device is intended for use with two-way radios that have a memory for storing at least some radio control parameters, an internal computer for controlling at least some radio control functions in response to the stored parameters, and at least one replaceable hardware element that supports operation of the radio.

The device includes an appropriate coupling mechanism to allow access to at least the memory in the radio, and a programming station for communicating with the radio via the coupling mechanism. The programming station allows an operator to access the memory and write radio control parameters thereto. More particularly, the programming station stores radio control parameters in the radio's memory in a particular predefined order, subsequent to replacing a replaceable hardware element.

In one embodiment, the programming station inhibits an attempt to store parameters in the radio's memory unless the radio is both coupled to the programming station and the radio is switched on.

In another embodiment of the invention, the programming station displays all relevant steps that relate to a particular hardware element replacement process, including both operator-only and programming station-assisted steps. Although these steps are displayed simultaneously, the programming station will only allow the steps to be processed in a particular predefined order.

BEST MODE FOR CARRYING OUT THE INVENTION

Figure 1:
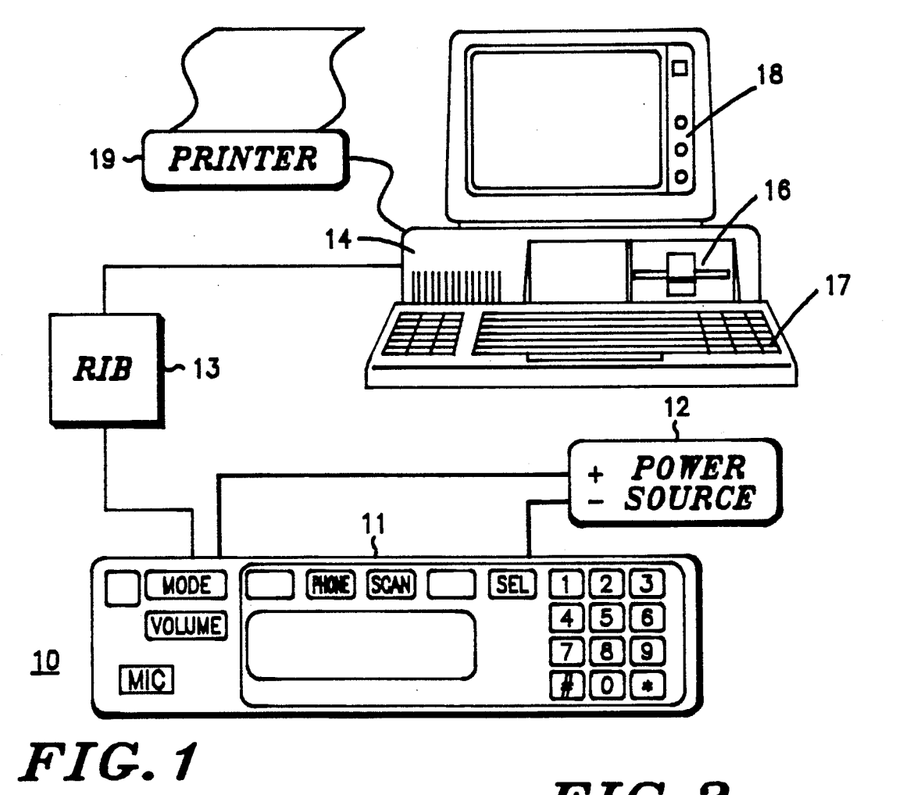
FIG. 1 comprises a block diagram depiction of the invention as coupled to a two-way radio.

Referring now to FIG. 1, the programming station, depicted generally by the numeral 10, operates in conjunction with an appropriate two-way radio (11). The radio (11) connects to an appropriate power source (12) and the programming station (10) couples to the radio (11) through an appropriate coupling mechanism; in this case, a radio interface box (13). Each of these components will now be described in more detail in seriatim fashion.

The radio (11) may be, for example, a Spectra brand two-way land mobile radio as manufactured and sold by Motorola, Inc. Such a radio has an internal microprocessor for controlling its radio control functions. (As used herein, "radio control functions" refers to radio specific performance parameters, such as deviation, reference oscillator, transmit power, signalling deviation, and so forth.)

This radio has many of its hardware elements arranged on replaceable boards. For example, any of the command board (which includes the microprocessor), the memory board, the power amplifier board, the RF board, and the VCO board can be replaced as a unit during servicing. Replacement of such boards, however, generally requires some reprogramming of the radio to ensure the proper functioning of the radio with the new board.

The microprocessor in the radio communicates with other devices within the radio and external to the radio on a serial bus. The radio interface box (13) functions to level shift the RS232 voltage level signals that are output and received by the programming station (10) to an appropriate signal level that is compatible with the radio's serial bus interface.

The radio interface box (13) may be provided through use of Part No. 01-80353A74. The cable between the radio interface box (13) and the radio (11) may be provided through use of Part No. 30-80369B73.

The cable between the radio interface box (13) and the programming station (10) may be provided through use of a Part No. 30-80369B71. All of the above noted parts are manufactured and sold by Motorola, Inc.

The programming station (10) can be comprised of an IBM personal computer or compatible (14), which includes at least one RS232 port, 512K RAM, and a DOS 3.0 operating system. In addition, at least one disk drive (16), a keyboard (17), a display screen for displaying alphanumeric information (18) and a printer (19) should be provided.

A microfiche appendix of a software program is included with this specification. With this program loaded in the programming station (10), the programming station (10) will function as described below.

Figure 2:
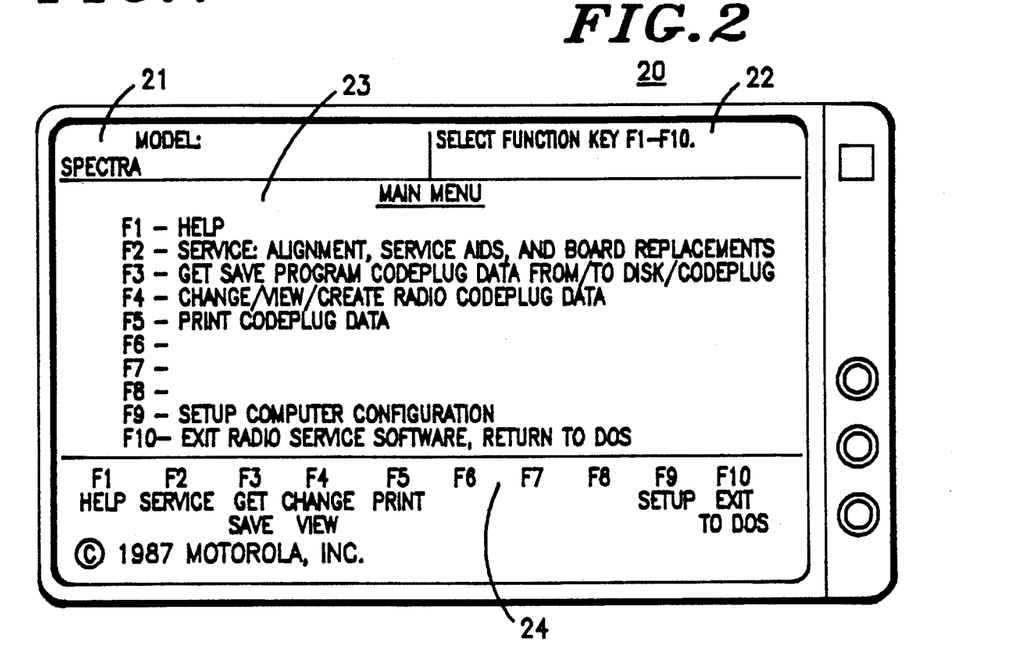
FIG. 2 comprises a depiction of a main menu as presented at the programming station.

Referring now to FIG. 2, most actions of the programming station (10) are controlled through the use of formatted screen displays and the function keys ordinarily found on the keyboard (17) (i.e., F1–F10). In general, all screens provided at the programming station (10) use an identical format, with the screen being divided into four dedicated sections. The first dedicated section comprises a box (21) in the upper left hand corner of the display screen. This box (21) displays the radio's trademark (in this case, "Spectra") or other desired indicia, along with the model number (or other radio type indicia) of the radio as read from the radio's memory (the model number is not displayed in FIG. 2 but can be seen in FIG. 4).

The second dedicated section comprises a box in the upper right hand corner (22) that displays an indication of a generic type of input that the programming station (10) expects at that time from the user. For example, as depicted in FIG. 2, the words "Select Function Key F1–F10" instruct the operator that one of the indicated function keys must be actuated to select a desired operation. Also, error messages and data entry errors are displayed in this box (22) when necessary.

The third dedicated section comprises a large center box (23) that contains menu descriptions or data entry fields, depending upon the function currently in progress. FIG. 2 displays the main menu in this section (23). The main menu indicates the other functions that can be accessed through use of the function keys.

Finally, the fourth dedicated section comprises an area at the bottom (24) of the screen. This section (24) provides an abbreviated indication of each function key operation. In general, the location of this display indicia coincides with the general location of the function keys themselves as an additional aid to the operator.

Figure 3:
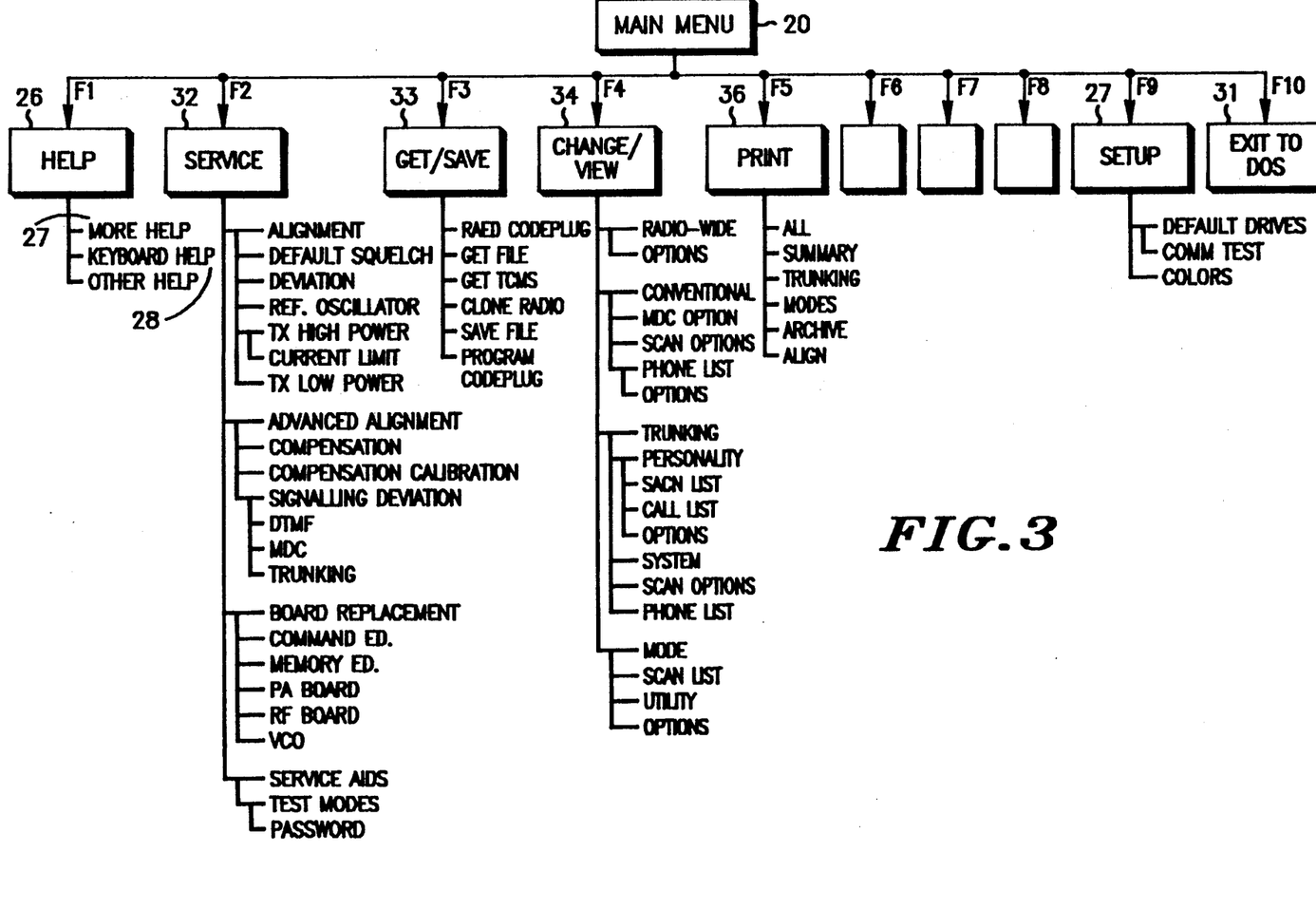
FIG. 3 comprises a diagrammatic representation of the functional capabilities of the programming station.

With reference to FIG. 3, the programming station (10) provides screens and functions organized as depicted. The system will not allow an operator to randomly jump from one screen or function to another. Instead, the operator must move up and down the branches by using the menu screens and function keys in an appropriate manner. For example, pushing the F1 function key will provide a help function (26) which in turn leads to various other help options, including "more help" (27) and "keyboard help" (28). The help options provide helpful supplemental information regarding the operation of the programming station (10) to the user.

In addition to the help function (26), the main menu (20) provides access to an initial setup function (29) and an exit routine (31). The main menu (20) also allows access to four important service and programming menus: service (32), get/save (33), change/view (34), and print (36). (Additional information regarding the service function (32), the get/save functions (33) and the print function (36) can be found in copending U.S. patent application Ser. No. 175,084, filed on Mar. 30, 1988 and entitled Radio Programming Device, Ser. No. 175,003, filed Mar. 30, 1988 and entitled Radio Alignment/Programming Device, and Ser. No. 175,002, filed on Mar. 30, 1988 and entitled Radio Programming Device With Access To A Remote Database, which applications are incorporated herein by this reference.)

In general, the service function (32) comprises a multilevel menu routine that supports radio alignment, advanced alignment, board replacement, and service aids functions. All service screens access the memory in the radio directly, and it is not necessary to read the radio's memory via the get/save function (33) before using the service screens. All service screens use the same four dedicated screen sections described earlier.

The get/save function (33) generally functions to read radio control and radio feature parameters as stored in a radio's memory, and to obtain archived parameter information from a diskette or hard disk. However obtained, the change/view function (34) can then be used to edit the parameter information. The get/save function (33) also operates to write modified parameter information into the radio's memory, or to save the modified parameters to an archive file on a diskette or hard disk.

Finally, the print function (36) allows production of permanent records of parameter configurations.

Figure 4:
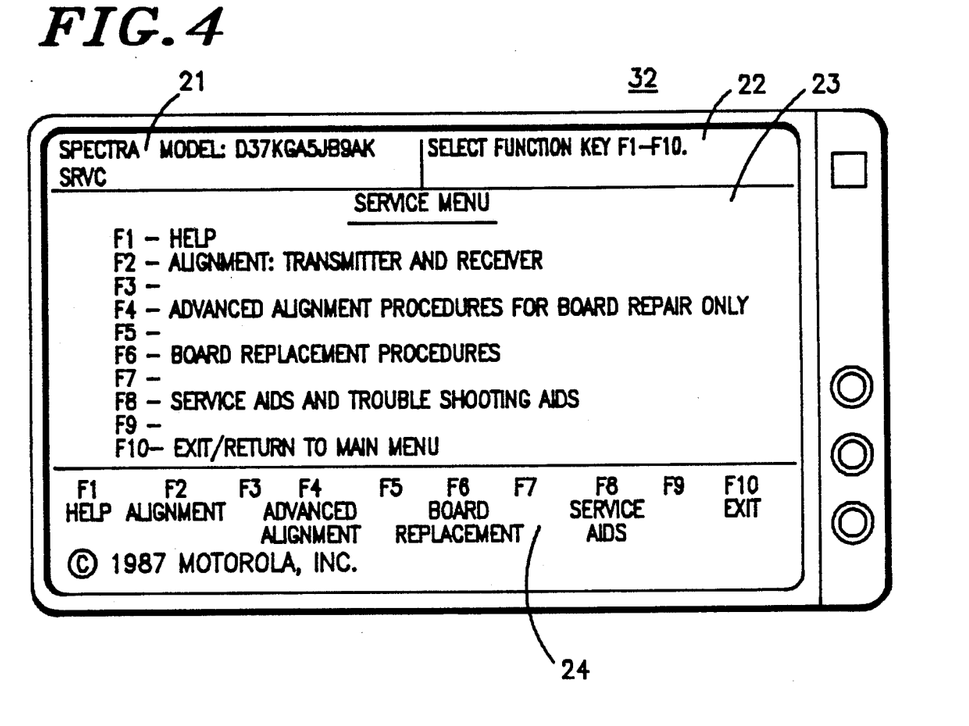
FIG. 4 comprises a depiction of a service menu as presented at the programming station.

Referring now to FIG. 4, the service function (32) will be described in more detail.

All radio alignment and board replacement procedures are accessed from the service menu (32). A radio must be connected to the programming station (10) and the radio must be active before the programming station (10) will allow a user to access the service menu (32). Also, all service screens read and program the radio's memory directly. The user does not need the get/save functions (33) to use the service features.

Figure 5:
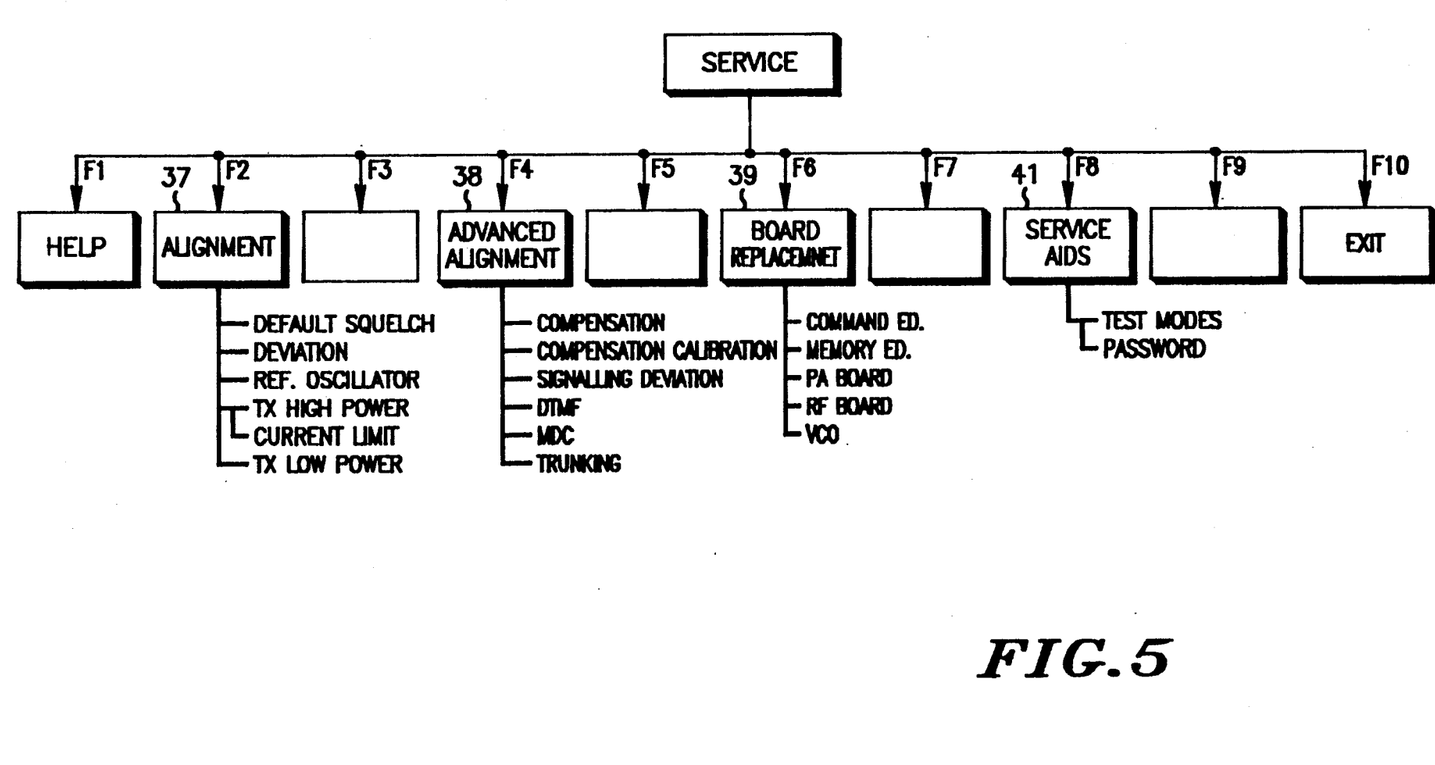
FIG. 5 comprises a diagrammatic representation of the functional capabilities available at the programming station from the service menu.

From the service menu (32), a user can select function key F1 for help. Function key F2 can be selected to initiate the alignment functions. With reference to FIG. 5, the alignment function (37) allows adjustment of default squelch, transmitter VCO deviation, reference oscillator warp, transmitter power set (both high and low) and transmitter current limit.

With reference to both FIGS. 4 and 5, function key F4 can be selected to initiate certain advanced alignment functions (38). These include transmitter VCO compensation adjustment, transmitter VCO compensation calibration, and signalling deviation adjustments as may be relevant.

Function key F6 initiates the board replacement function (39). This function allows servicing of the radio when a board repair and/or replacement is necessary. Special initialization procedures and step by step instructions are given for all realignment procedures when replacing or servicing the command board, the memory board, the power amplifier board, the RF board, or the VCO board. More detail regarding the board replacement functions (39) will be provided below.

Finally, the F8 function key initiates a service aids function (41) that interacts with special test capabilities that may be designed into the radio itself.

Figure 6:
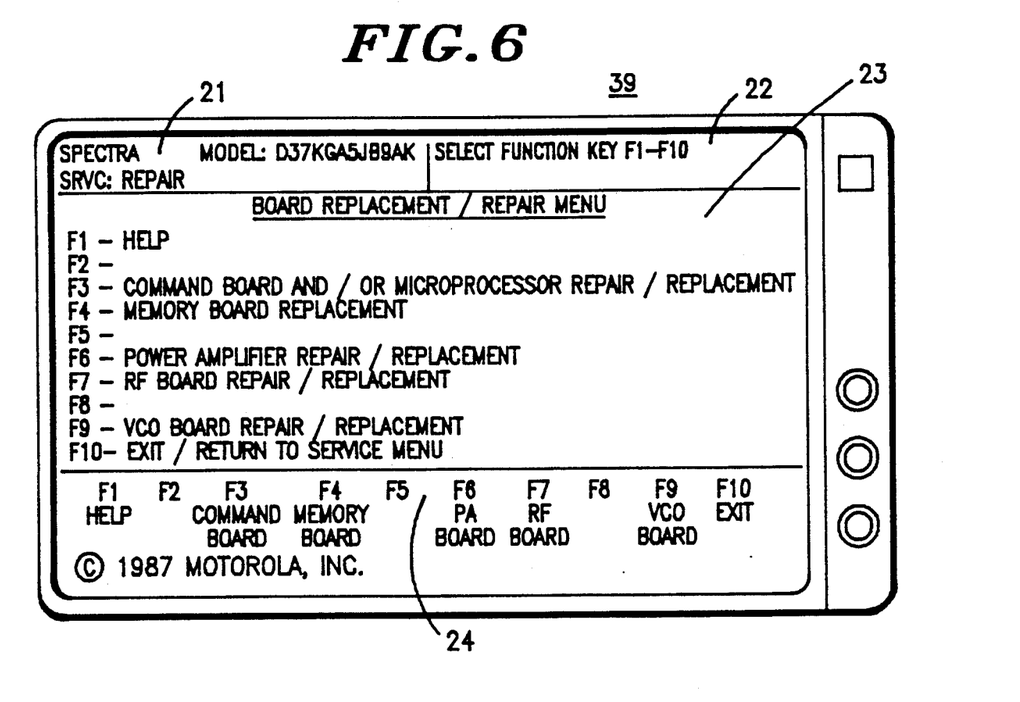
FIG. 6 comprises a depiction of a board replacement/repair menu as presented at the programming station.

Selection of the F6 function key from the service menu (32) will initiate the board replacement function (39) as mentioned earlier. With reference to FIG. 6, this allows presentation at the programming station (10) of the board replacement/repair menu screen as depicted. From this menu, the user can select proper programming procedures that relate to replacement or repair of the command board (or microprocessor) (function key F3), replacement of the memory board (function key F4), repair or replacement of the power amplifier (function key F6), repair or replacement of the RF board (function key F7), and repair or replacement of the VCO board (function key F9). Step by step instructions are provided to the user for all realignment procedures when replacing or servicing the above noted hardware elements of the radio. In addition, each procedure, though simultaneously fully displayed, allows execution only in a top to bottom order to ensure proper final calibration.

Figure 7:
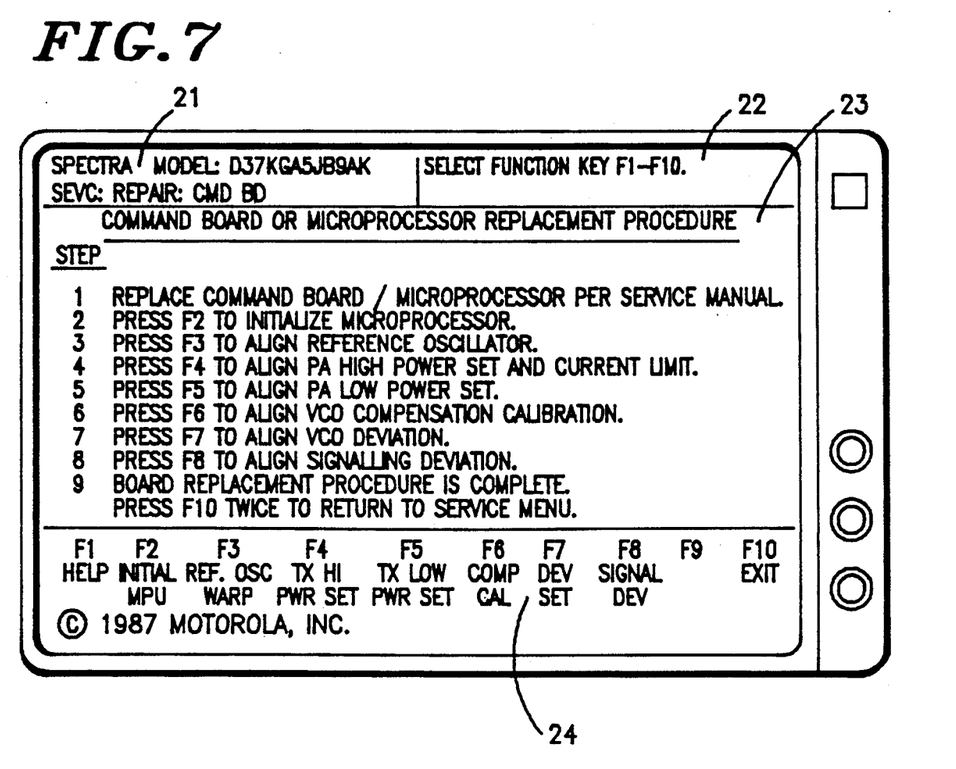
FIG. 7 comprises a depiction of a command board or microprocessor replacement procedure menu as presented at the programming station.

Referring now to FIG. 7, the command board replacement procedure will be described.

Replacing the command board and/or microprocessor will require that the microprocessor be initialized and that the radio be completely realigned. This board replacement function performs both tasks. Before this alignment process can be initiated, however, the command board/microprocessor must first be replaced. This constitutes a user-only step that cannot be accomplished through use of the programming station. Nevertheless, the programming station (10), in step 1, does instruct the operator to replace the command board/microprocessor as per the instructions in the relevant service manual. Therefore, before the programming station (10) allows a user to attempt to initialize and/or align the radio, the user is reminded that the hardware elements in question must be replaced first.

When the hardware elements as indicated have been replaced, the user then selects the enter key on his keyboard (17) to indicate completion of step 1 and to enable the next step. Again, only the function key for the currently allowable step will be enabled. The user is therefore restricted to a correct predetermined sequence of steps.

Prior to initializing the microprocessor or realigning the radio, of course, the user must also have the proper and usual alignment equipment appropriately connected to the radio. Also, once the alignment sequence has been initiated, all of the steps indicated at the programming station (10) must be completed in the indicated sequence.

By next selecting function key F2, the user can initialize the microprocessor in the radio. When this has been completed, the alignment process can begin by selection of function key F3. Following that, and in sequence, function keys F4–F8 are initiated in turn to accomplish alignment of the reference oscillator, alignment of the PA high power set and current limit, alignment of the PA low power set, alignment of VCO compensation calibration, alignment of VCO deviation, and alignment of signalling deviation.

When the alignment process has been completed, the operator may return to the service menu (32) by pressing function key F10 twice.

Figure 8:
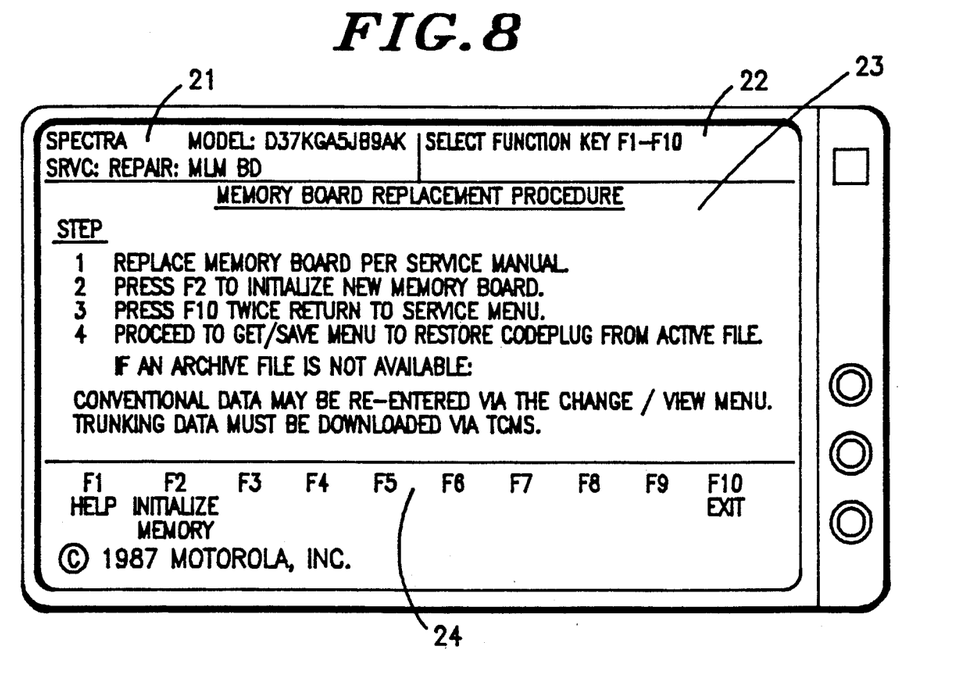
FIG. 8 comprises a depiction of a memory board replacement procedure menu as presented at the programming station.

Referring now to FIG. 8, the memory board replacement procedure as accessed through the board replacement/repair menu (39) will be described.

Again, this process presupposes that a memory board is being replaced in accordance with the instructions in the service manual as indicated in step 1. The user is then required to select the enter key to enable the next function.

Selection of function key F2 serves to initialize the new memory board. Once this function has been accomplished, it then becomes necessary to program that memory with all relevant radio control parameters. Since the programming station (10) provides the capability to store an archive copy of all radio control parameters of all radios that it has programmed, and since the memory board replacement procedure presupposes that the radio has been previously programmed but now needs a new memory board, the procedure provides, as step 4, the opportunity to proceed to the get/save function (33) to allow restoration of the previously stored information to the radio. Otherwise, the user can exit to the service menu by selecting the F10 function key twice, or choose the change/view function (34) to either obtain new data for conventional radios or trunking data for trunked radios via the TCMS capabilities of the change/view function (34). All of the above options are displayed on the screen and assist in guiding the user to a correct selection.

Figure 9:
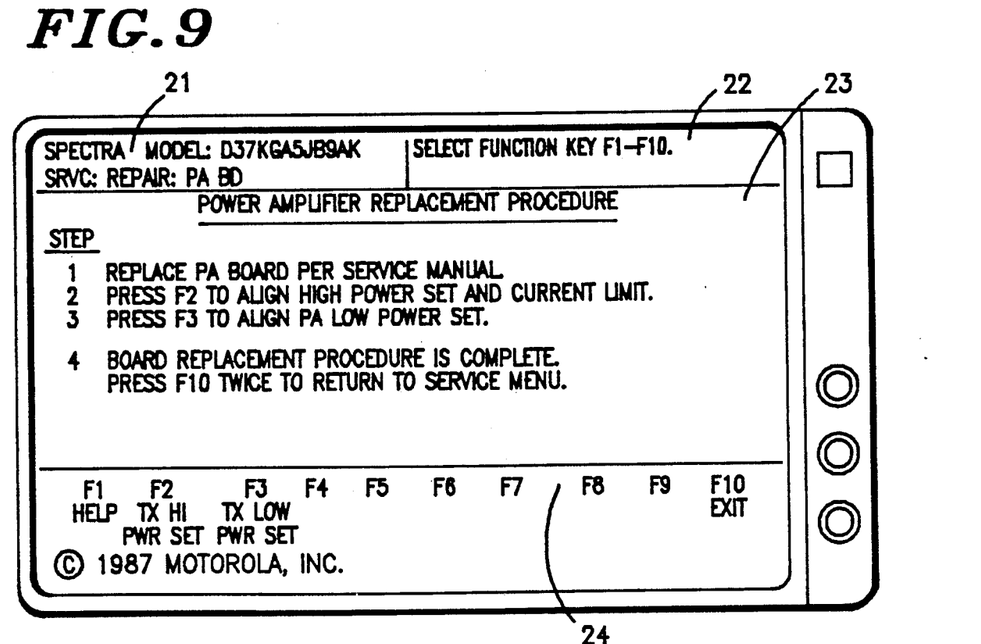
FIG. 9 comprises a power amplifier replacement procedure menu as presented at the programming station.

Referring now to FIG. 9, the power amplifier replacement procedure as selected through the board replacement/repair menu (39) will be described.

As required earlier, this procedure also requires as step 1 the replacement of the PA board itself. The user indicates completion of this step by selection of the enter key. The user then selects the appropriate alignment procedures (alignment of the PA high power set and current limit, and alignment of the PA low power set) through sequential selection of function keys F2 and F3, in that order. No other alignment procedures are then required, and the user can return to the service menu (32) by selecting the F10 function key twice.

Figure 10:
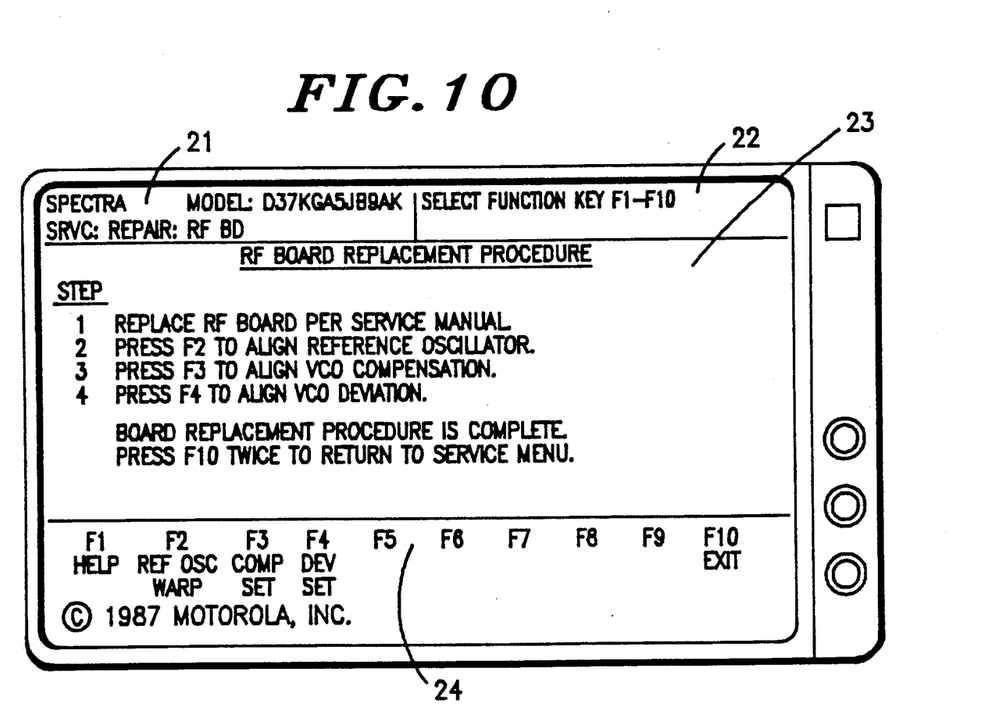
FIG. 10 comprises an RF board replacement procedure menu as presented at the programming station.

Referring now to FIG. 10, the RF board replacement procedure as selected through the board replacement/repair menu (39) will be described.

Step 1, requiring replacement of the RF board, can be indicated by the user through selection of the enter key. The user then initiates and completes alignment of the reference oscillator, VCO compensation, and VCO deviation through selection of function keys F2, F3, and F4, in that order. The user can then return to the service menu (32) by twice selecting the F10 function key.

Figure 11:
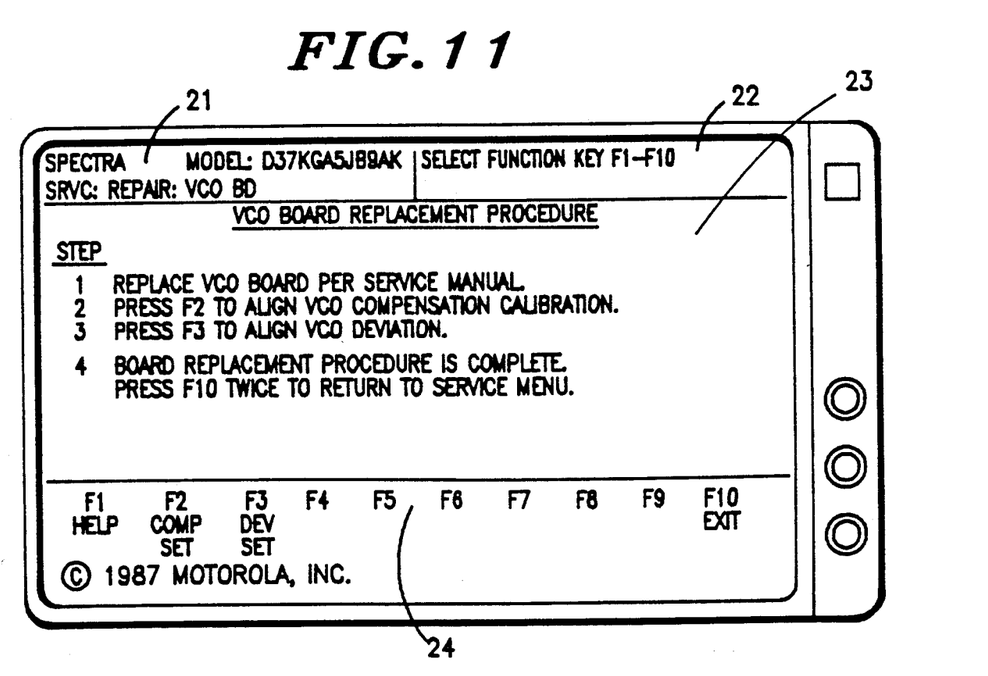
FIG. 11 comprises a VCO board replacement procedure menu as presented at the programming station.

Lastly, with reference to FIG. 11, VCO board replacement procedure as selected from the board replacement/repair menu (39) will now be described.

Following replacement of the VCO board and indication of same through the enter key, the user can adjust VCO compensation calibration and VCO deviation by selecting function keys F2 and F3 in that order. The service menu (32) can then be selected by twice selecting the F10 function key.

Through use of this programming station (10), initialization of appropriate components and realignment of the radio can be accomplished following repair or replacement of various hardware elements in the radio. The alignment steps and other user and device assisted steps are presented in a predetermined fashion to ensure proper calibration of the radio, and execution of the steps is allowed in only this predetermined manner.

We claim:

1. A device for programming a radio, which radio includes:

at least one replaceable hardware element that supports operation of said radio;

memory means for storing at least some radio control parameters;

computer means for controlling at least some radio control functions in response to said radio control parameters;

said device comprising:
A) coupling means for coupling to said memory means; and
B) means for connecting to said coupling means and for storing said radio control parameters in said memory means in a particular predefined order when programming said radio subsequent to replacing said at least one replaceable hardware element wherein said means includes:
  i) input means for receiving input from an operator; and
  ii) display means for displaying both operator-only and device-assisted steps for replacing said replaceable hardware element.

2. The device of claim 1 wherein said means includes inhibit means for inhibiting access to storing said radio control parameters in said memory means in a particular predefined order except when said means is connected to said coupling means and said coupling means is coupled to said memory means.

3. The device of claim 2 wherein said inhibit means will also inhibit access to storing said radio control parameters in said memory means in a particular predefined order when said radio is switched off.

4. The device of claim 1 wherein said means further includes key means for causing said radio to transmit.

5. The device of claim 4 wherein said key means includes timer means for causing said radio to cease transmitting after a predetermined period of time.

6. The device of claim 1 wherein:
A) said display means simultaneously displays all of said operator-only and device-assisted steps for replacing a particular replaceable hardware element; and
B) said means only accepts input with respect to a predetermined one of said steps in accordance with said particular predefined order.

7. The device of claim 6 wherein each of said steps must be individually initiated by a user of said means.

8. A method of changing a hardware element in a radio and aligning said radio, wherein said radio includes:
at least one replaceable hardware element that supports operation of said radio;
memory means for storing at least some radio control parameters; and
computer means for controlling at least some radio control functions in response to said radio control parameters;
the method comprising the steps of:
A) providing a programming station having a display and an input device, which programming station communicates with at least said memory means to allow said radio control parameters to be programmed by said programming station;
B) displaying, in a predetermined order, a plurality of programming station-assisted procedures for programming at least some of said radio control parameters, wherein said plurality of programming station-assisted procedures are displayed in a predetermined order;
C) enabling only one of said displayed procedures at a time to allow its selective implementation.

9. The method of claim 8 wherein said plurality of programming station-assisted procedures are displayed simultaneously.

10. The method of claim 8 wherein step B includes the step of:
displaying user-only procedures that relate to replacement of said hardware element, such that said plurality of programming station-assisted procedures and said user-only procedures are displayed in a predetermined order.

11. A method of changing a hardware element in a radio and aligning said radio, wherein said radio includes:
at least one replaceable hardware element that supports operation of said radio;
memory means for storing at least some radio control parameters;
computer means for controlling at least some radio control functions in response to said radio control parameters;
the method comprising the steps of:
A) providing a programming station having a display and an input device, which programming station communicates with at least said memory means to allow said radio control parameters to be programmed by said programming station;
B) displaying, on a display:
user-only procedures that relate to replacement of said hardware element;
a plurality of programming station-assisted procedures for programming at least some of said radio control parameters;
wherein said user-only procedures and said plurality of programming station-assisted procedures are displayed in a predetermined order;
C) enabling only one of said displayed procedures at a time to allow selective implementation of only that enabled procedure.

12. The method of claim 11 wherein said selective implementation is implemented by a user of said programming station through said input device.

13. The method of claim 12 wherein said input device is a keyboard.

14. The method of claim 11 wherein said procedures are singularly enabled in a predetermined order.

15. The method of claim 14 wherein said predetermined order for enabling said procedures and said predetermined order for displaying said procedures are identical.

16. The method of claim 11 wherein said procedures are displayed simultaneously.

* * * * *